No. 694,255. Patented Feb. 25, 1902.
A. L. DANA.
GOLD SEPARATOR.
(Application filed June 29, 1901.)
(No Model.) 3 Sheets—Sheet 1.

WITNESSES:

INVENTOR
Arthur L. Dana
BY
ATTORNEYS

No. 694,255.　　　　　　　　　　　　　　　　　　　　　Patented Feb. 25, 1902.
A. L. DANA.
GOLD SEPARATOR.
(Application filed June 29, 1901.)

(No Model.)　　　　　　　　　　　　　　　　　　　　　3 Sheets—Sheet 3.

WITNESSES:　　　　　　　　　　　　　　　　　　　　　INVENTOR
　　　　　　　　　　　　　　　　　　　　　　　　　　　Arthur L. Dana
　　　　　　　　　　　　　　　　　　　　　　　　　　　BY
　　　　　　　　　　　　　　　　　　　　　　　　　　　　　ATTORNEYS

UNITED STATES PATENT OFFICE.

ARTHUR L. DANA, OF COLORADO SPRINGS, COLORADO.

GOLD-SEPARATOR.

SPECIFICATION forming part of Letters Patent No. 694,255, dated February 25, 1902.

Application filed June 29, 1901. Serial No. 66,491. (No model.)

*To all whom it may concern:*

Be it known that I, ARTHUR L. DANA, a citizen of the United States, and a resident of Colorado Springs, in the county of El Paso and State of Colorado, have invented a new and Improved Gold-Separator, of which the following is a full, clear, and exact description.

This invention relates to improvements in machines for separating gold or other metals from their ores; and the object is to provide a machine by means of which the values may be rapidly and thoroughly separated without the use of quicksilver or copper plates.

I will describe a gold-separator embodying my invention, and then point out the novel features in the appended claims.

Reference is to be had to the accompanying drawings, forming a part of this specification, in which similar characters of reference indicate corresponding parts in all the figures.

Figure 1:
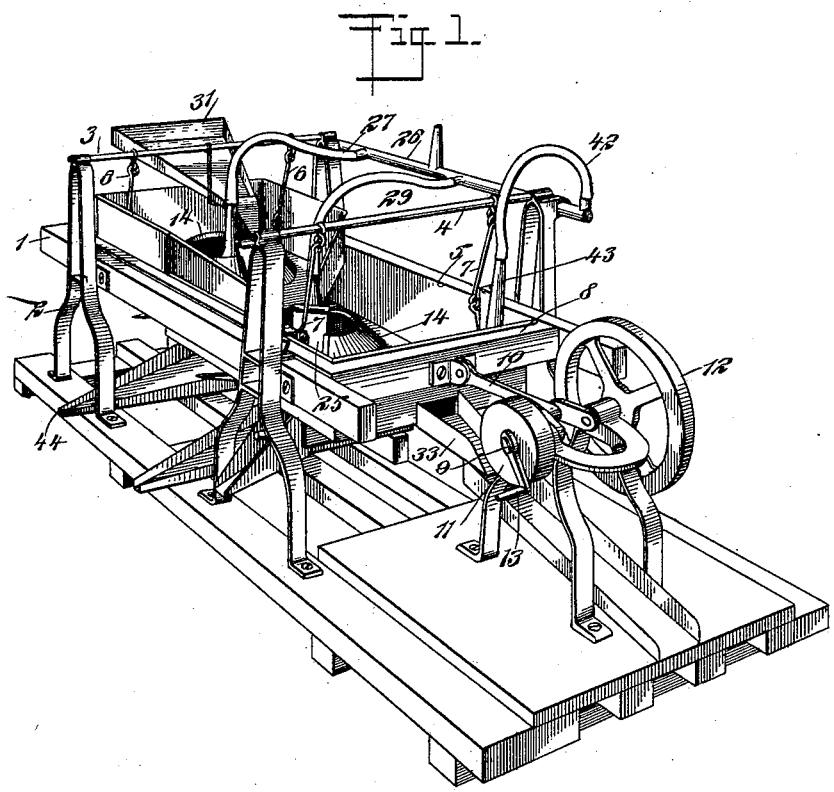
Figure 2:
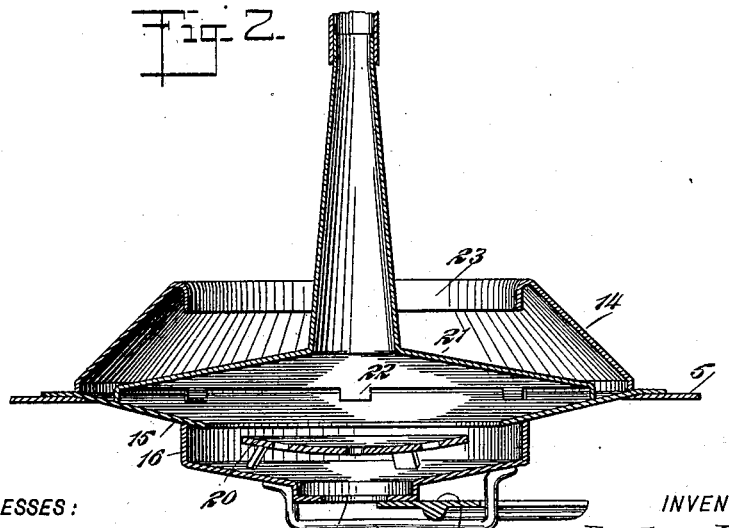
Figure 3:
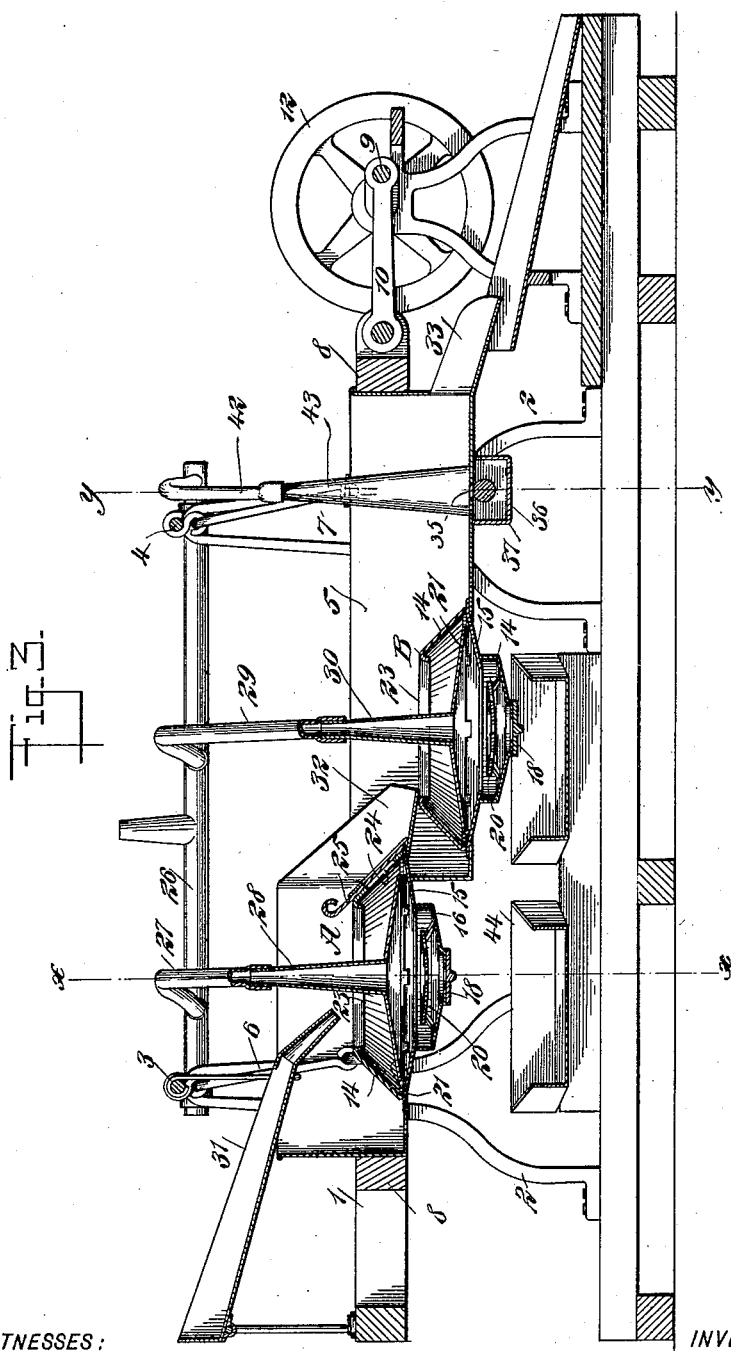
Figure 4:
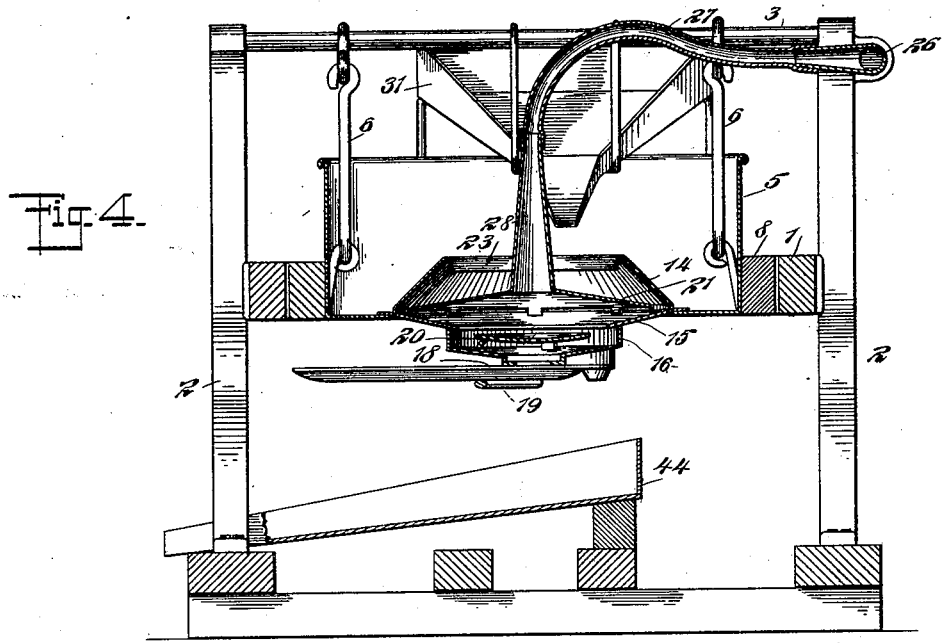
Figure 5:
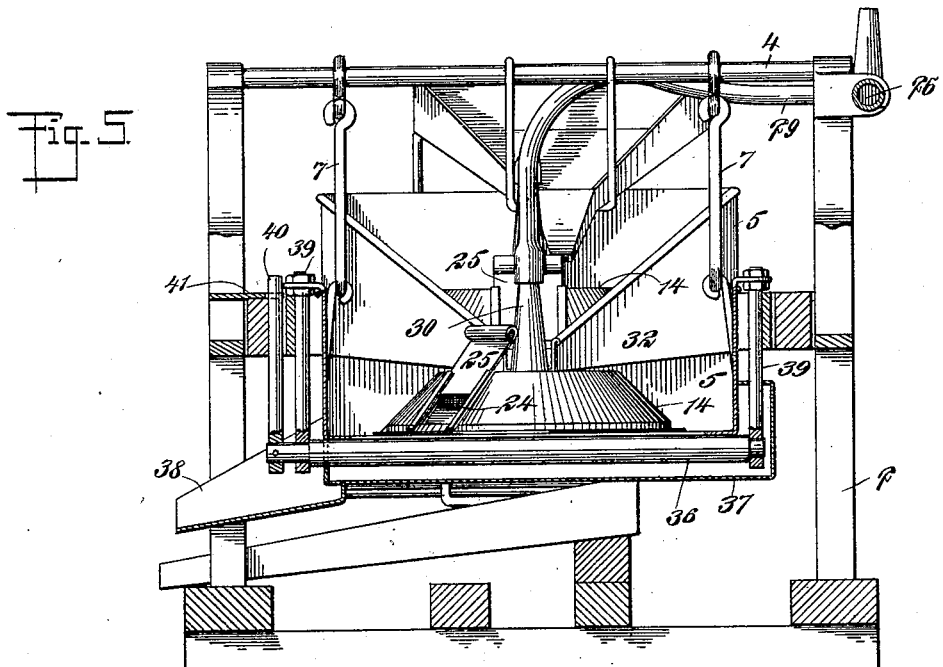

Figure 1 is a perspective view of a separator embodying my invention. Fig. 2 is a sectional elevation of a trap employed. Fig. 3 is a longitudinal vertical section of the separator. Fig. 4 is a section on the line $x$ $x$ of Fig. 3, and Fig. 5 is a section on the line $y$ $y$ of Fig. 3.

The separator comprises a suitable frame 1, supported by standards 2, the standards being arranged in pairs near opposite ends of the frame. These standards are projected above the frame, and connected with the opposite standards 2 at the feed end of the machine is a rod 3, while connected to the other standards 2 is a rod 4. A pan 5 has swinging connection with the rods 3 and 4. As here shown, links 6 extend from the pan at one end to a connection with the rod 3, while links 7 extend from the opposite end of the pan and connect with the rod 4. The pan is surrounded by a frame 8, which may consist of wood. Lengthwise reciprocating motion is imparted to the pan from a crank-shaft 9, from the crank of which a pitman 10 extends to a connection with one end of the frame 8. On the crank-shaft is a driving-pulley 11 and a balance-wheel 12. The shaft may be driven by a connection with the pulley 11, or it may be operated manually by means of a crank 13.

Arranged in the pan are traps A and B, the trap at the feed end of the pan being on a higher plane than the trap between it and the outlet end of the pan. The traps are of similar construction, and a description of one will answer for both. The construction is clearly shown in Fig. 2. It consists of an upwardly and inwardly tapered hood 14, connected at its lower edge to a downwardly and inwardly inclined ring-plate 15, and connected to the under side of this ring-plate is a tray 16, having an opening 17 in its bottom wall, which is normally closed by a swinging valve-plate 18. It will be noted that the valve-plate 18 has an extended portion which forms a lever by means of which it may be operated, and on the under side is a longitudinal rib which engages with a loop 19 to force the valve closely against the bottom of the trap, and thus prevent the escape of liquid or material. Supported within the tray above the opening in its bottom is a perforated plate 20, which is concaved or dished, as plainly shown, and supported on the ring-plate 15 above the hood is a spreader-plate 21. At suitable intervals or distances apart the spreader-plate is provided with legs 22, which are secured to the ring-plate, thus leaving a space between the legs through which water may freely pass. The upper edge of the hood 14 is turned inward and downward, as at 23, so as to catch any fine gold or other values that might possibly creep up the wall of the hood. The hood 14 has an opening 24 at its side toward the outlet, and this opening is normally closed by a slide-valve 25.

Extended along one side of the machine is a water-pipe 26, designed to receive water from any suitable source. This water-pipe has a flexible-tube connection 27 with a pipe 28, leading through the spreader-plate 21 of the trap A, and it also has a flexible-tube connection 29 with a tube 30, leading through the plate 21 of the trap B. A suitable spout 31 is arranged to discharge ore, sand, and metal into the trap A, and the overflow from the trap A passes through a spout 32 into the trap B. At the outlet end of the pan there is a spout 33 for the discharge of tailings and the like. Inward of this spout is a riffle-bar 34, and an opening 35 is provided in the bottom of the pan and extends across the same just inward of the riffle 34. A bar 36 is mounted to rock below the opening 35. This bar extends through a boxing 37, which at its outlet end discharges into a spout 38. The bar 36 has its bearings in hangers 39, attached to the frame 8, and extended upward from the bar 36 at one end is a lever 40. This lever 40 passes through an opening in a side member of the frame 1 and engages in a notch or slot formed in a plate 41, attached to the frame 1 or to one of the uprights. Obviously as the pan is moved back and forth a rocking motion will be imparted to the bar 36. This rock-bar acts as a concentrator for the tailings, and a current of water passing through the boxing 37 will keep the mineral from packing on the bar. The water is supplied to the boxing through a flexible tube 42, extended from the pipe 26 and connecting with a pipe 43, discharging into the boxing.

In operation the mineral will pass first into the trap A, and the water passing into the same or underneath the spreader-plate will cause an undercurrent which will lift the mineral, while gold or other values settle to the bottom by specific gravity. If any gold escapes from the first trap, it is carried with the overflow to the second trap, where the same process takes place. The overflow and tailings will pass out through the spout 33, and any values that may be carried along therewith in the pan will be stopped by the riffle 34. It may be here stated that a greater number of riffles may be employed, if desired.

In cleaning up the machine the valve 25 of the trap A is to be opened, so as to run off all surplus dirt into the second trap. Then the valve in the trap A is to be closed and the valve 18 at the bottom of said trap opened, so as to permit the gold and dirt to pass out into a spout 44, and this operation is to be repeated with the trap B.

Having thus described my invention, I claim as new and desire to secure by Letters Patent—

1. In a separator, a reciprocating pan, a plurality of traps arranged therein, a spreader-plate on each trap, and water-supply pipes leading into the traps, substantially as specified.

2. In a separator, a reciprocating pan, a plurality of traps arranged therein, the traps being on different horizontal planes, a spreader-plate on each trap, and water-supply pipes leading into the traps, substantially as specified.

3. In a separator, a pan, a trap arranged in said pan, comprising a hood open at the top, a ring-plate on which the hood is supported, a tray attached to the under side of the ring-plate and having a valve-controlled opening in its bottom, a perforated disk supported in the tray, a spreader-plate supported on the ring-plate, and a water-pipe providing communication to the under side of said spreader-plate, substantially as specified.

4. In a separator, a pan, a trap arranged therein, comprising an upwardly and inwardly tapered hood having an inwardly and downwardly extended flange at its upper edge, a dished ring-plate on which the hood is supported, a tray attached to the under side of the ring-plate and having a valve-controlled opening in its bottom, a dished perforated disk supported in the tray, an upwardly and inwardly inclined spreader-plate having spaced legs resting on the ring-plate, and a water-supply pipe leading through said spreader-plate, substantially as specified.

5. A gold-separator, comprising an oscillating pan, means for causing the movements of said pan, traps arranged in the pan, the trap at the feed end of the pan being on a higher elevation than the trap between it and the outlet end of the pan, valves for controlling openings in the upper portions of the traps, perforated disks supported in the traps, and means for supplying water to the traps, substantially as specified.

In testimony whereof I have signed my name to this specification in the presence of two subscribing witnesses.

ARTHUR L. DANA.

Witnesses:
HENRY F. BOWMAN,
ADOLPH WAGNER.